(12) United States Patent
Beck et al.

(10) Patent No.: US 9,476,482 B2
(45) Date of Patent: Oct. 25, 2016

(54) MULTI-SPEED GEARBOX

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 52 days.

(21) Appl. No.: 14/396,081

(22) PCT Filed: Mar. 13, 2013

(86) PCT No.: PCT/EP2013/055061
§ 371 (c)(1),
(2) Date: Oct. 22, 2014

(87) PCT Pub. No.: WO2013/159992
PCT Pub. Date: Oct. 31, 2013

(65) Prior Publication Data
US 2015/0080168 A1 Mar. 19, 2015

(30) Foreign Application Priority Data
Apr. 27, 2012 (DE) .................. 10 2012 207 031

(51) Int. Cl.
*F16H 3/62* (2006.01)
*F16H 3/44* (2006.01)
(Continued)

(52) U.S. Cl.
CPC ........... *F16H 3/66* (2013.01); *F16H 2003/445* (2013.01); *F16H 2200/0065* (2013.01);
(Continued)

(58) Field of Classification Search
CPC ................ F16H 2200/2012; F16H 2200/2097
See application file for complete search history.

(56) References Cited

U.S. PATENT DOCUMENTS 3,956,946 A * 5/1976 Murakami ................ F16H 3/66
475/276
6,705,969 B2 * 3/2004 Bucknor ................... F16H 3/66
475/275
(Continued)

FOREIGN PATENT DOCUMENTS

DE         101 15 995 A1   10/2002
DE    10 2008 031 970 A1    1/2009
(Continued)

OTHER PUBLICATIONS

German Search Report Corresponding to 10 2012 207 031.1 mailed Dec. 19, 2012.
(Continued)

*Primary Examiner* — Tisha Lewis
(74) *Attorney, Agent, or Firm* — Davis & Bujold, PLLC; Michael J. Bujold (57) ABSTRACT

A four-stage multi-stage transmission in which carrier of first gear set and ring gear of fourth gear set can be coupled to housing via first brake or to drive shaft via first clutch. Sun of first gear set can be coupled to housing via second brake. Ring gear of first gear set and sun of second gear set can be coupled to drive shaft via second clutch. Drive shaft can be coupled to ring gear of second gear set via third clutch. Carrier of second gear set is permanently connected to carrier of fourth gear set, and carrier of third gear set and sun of fourth gear set are permanently connected to drive shaft. By varying further couplings within the multi-stage transmission, a set of gears having similar properties is provided.

14 Claims, 3 Drawing Sheets

(51) Int. Cl.
*F16H 37/06* (2006.01)
*F16H 3/66* (2006.01)

(52) U.S. Cl.
CPC .................. *F16H2200/0082* (2013.01); *F16H 2200/2012* (2013.01); *F16H 2200/2046* (2013.01); *F16H 2200/2094* (2013.01); *F16H 2200/2097* (2013.01)

(56) References Cited

U.S. PATENT DOCUMENTS

| | | | |
|---|---|---|---|
| 6,960,149 B2 | 11/2005 | Ziemer | |
| 7,695,398 B2 | 4/2010 | Phillips et al. | |
| 8,210,981 B2 | 7/2012 | Bauknecht et al. | |
| 8,398,522 B2 | 3/2013 | Bauknecht et al. | |
| 9,175,752 B2 * | 11/2015 | Beck ....................... | F16H 3/666 |
| 2009/0197734 A1 | 8/2009 | Phillips et al. | |

FOREIGN PATENT DOCUMENTS

| | | |
|---|---|---|
| DE | 10 2008 038 210 A1 | 3/2009 |
| DE | 10 2008 000 428 A1 | 9/2009 |
| DE | 10 2008 000 429 A1 | 9/2009 |
| DE | 10 2008 041 196 A1 | 2/2010 |
| DE | 10 2008 041 200 A1 | 2/2010 |
| DE | 10 2008 041 209 A1 | 2/2010 |
| DE | 10 2009 020 442 A1 | 11/2010 |
| DE | 10 2009 028 670 A1 | 2/2011 |
| DE | 10 2009 047 279 A1 | 6/2011 |
| JP | 2005-083479 A | 3/2005 |
| JP | 2006-349153 A | 12/2006 |

OTHER PUBLICATIONS

German Search Report Corresponding to 10 2012 207 043.5 mailed Nov. 13, 2012.
German Search Report Corresponding to 10 2012 207 081.8 mailed Dec. 19, 2012.
German Search Report Corresponding to 10 2012 207 085.0 mailed Dec. 19, 2012.
German Search Report Corresponding to 10 2012 207 091.5 mailed Dec. 19, 2012.
German Search Report Corresponding to 10 2012 207 092.3 mailed Dec. 19, 2012.
International Search Report Corresponding to PCT/EP2013/055061 mailed May 21, 2013.
International Search Report Corresponding to PCT/EP2013/055060 mailed May 21, 2013.
International Search Report Corresponding to PCT/EP2013/055058 mailed May 21, 2013.
International Search Report Corresponding to PCT/EP2013/055057 mailed May 21, 2013.
International Search Report Corresponding to PCT/EP2013/055062 mailed May 21, 2013.
International Search Report Corresponding to PCT/EP2013/055059 mailed May 21, 2013.
Written Opinion Corresponding to PCT/EP2013/055061 mailed May 21, 2013.

* cited by examiner

| GEAR | ENGAGED SHIFT ELEMENT ||||||  GEAR RATIO | GEAR INTERVAL |
|---|---|---|---|---|---|---|---|---|
| | BRAKE ||| CLUTCH ||| i | φ |
| | 51 | 52 | 53 | 61 | 63 | 62 | | |
| 1 |  | × | × |  |  | × | 3.481 | |
| | | | | | | | | 1.510 |
| 2 |  | × | × | × |  |  | 2.305 | |
| | | | | | | | | 1.394 |
| 3 |  |  | × | × |  | × | 1.654 | |
| | | | | | | | | 1.242 |
| 4 |  |  | × |  | × | × | 1.332 | |
| | | | | | | | | 1.332 |
| 5 |  |  |  | × | × | × | 1.000 | |
| | | | | | | | | 1.291 |
| 6 |  | × |  | × | × |  | 0.775 | |
| | | | | | | | | 1.193 |
| 7 |  | × |  |  | × | × | 0.649 | |
| | | | | | | | | 1.318 |
| 8 | × | × |  |  | × |  | 0.493 | |
| | | | | | | | | 1.281 |
| 9 | × |  |  |  | × | × | 0.385 | |
| R | × |  | × |  |  | × | −2.985 | TOTAL 9.05 |
| M | × |  | × | × |  |  | 1.332 ||
| M |  | × | × | × |  |  | 1.332 ||
| M |  |  |  | × | × | × | 1.332 ||

Fig. 3

| GEAR | ENGAGED SHIFT ELEMENT ||||||  GEAR RATIO | GEAR INTERVAL |
|---|---|---|---|---|---|---|---|---|
| | BRAKE || CLUTCH |||| i | φ |
| | 51 | 52 | 61 | 63 | 62 | 64 | | |
| 1 |  | × |  |  | × | × | 3.481 | |
| | | | | | | | | 1.510 |
| 2 |  | × | × |  |  | × | 2.305 | |
| | | | | | | | | 1.394 |
| 3 |  |  | × | × |  | × | 1.654 | |
| | | | | | | | | 1.242 |
| 4 |  |  | × | × |  | × | 1.332 | |
| | | | | | | | | 1.332 |
| 5 |  |  | × | × | × |  | 1.000 | |
| | | | | | | | | 1.291 |
| 6 |  | × | × | × |  |  | 0.775 | |
| | | | | | | | | 1.193 |
| 7 |  | × |  | × | × |  | 0.649 | |
| | | | | | | | | 1.318 |
| 8 | × | × |  | × |  |  | 0.493 | |
| | | | | | | | | 1.281 |
| 9 | × |  |  |  | × | × | 0.385 | |
| R | × |  |  |  | × | × | −2.985 | TOTAL 9.05 |
| M | × |  | × |  | × |  | 1.332 ||
| M |  | × | × |  | × |  | 1.332 ||
| M |  |  | × | × | × |  | 1.332 ||

Fig. 4

MULTI-SPEED GEARBOX

This application is a National Stage completion of PCT/EP2013/055061 filed Mar. 13, 2013, which claims priority from German patent application serial no. 10 2012 207 031.1 filed Apr. 27, 2012.

FIELD OF THE INVENTION

The invention relates to a multi-stage transmission in planetary design, in particular for a motor vehicle.

BACKGROUND OF THE INVENTION

Such multi-stage transmissions are preferably used as automatic transmissions of motor vehicles, wherein the power flow within the planetary sets that is active in the respective gear step is defined by a targeted actuation of the shift elements. In an automatic transmission, the planetary sets are usually also connected to a start-up element, such as for example a hydrodynamic torque converter or a hydraulic clutch, which is subject to a slip effect and which is optionally provided with a bypass clutch.

There is known from DE 10 2008 000 428 A1 a multi-stage transmission in planetary design, in which there are arranged in a housing four planetary sets as well as a total of eight rotatable shafts, of which one is the drive shaft and another is the output shaft of the multi-stage transmission. Furthermore, there are provided in the region of the shafts at least six shift elements, the targeted actuation of which serves to vary the power flow within the four planetary sets and thus to define different transmission ratios between the drive shaft and the output shaft. As a result, it is possible to shift a total of nine forward gears and one reverse gear.

SUMMARY OF THE INVENTION

The problem addressed by the invention is that of specifying an alternative multi-stage transmission, preferably with an improved efficiency and with a transmission ratio range that is sufficiently large and sufficiently uniformly distributed.

The problem addressed by the invention is solved by a multi-stage transmission comprising at least four planetary gear sets, a housing, a drive shaft and an output shaft, wherein a carrier of a first planetary gear set and a ring gear of a fourth planetary gear set can be coupled to the housing, via a first brake, or to the drive shaft, via a first clutch, a sun gear of the first planetary gear set can be coupled to the housing, via a second brake, a ring gear of the first planetary gear set and a sun gear of a second planetary gear set can be coupled to the drive shaft, via a second clutch, the drive shaft can be coupled to a ring gear of the second planetary gear set, via a third clutch, a carrier of the second planetary gear set is permanently connected to a carrier of the fourth planetary gear set, a carrier of a third planetary gear set and a sun gear of the fourth planetary gear set are permanently connected to the drive shaft and one of the following two connections is configured as a permanent connection and one of said connections is configured such as to be able to be released by means of at least one shift element:

connection of a sun gear of the third planetary gear set to the housing and connection of the ring gear of the second planetary gear set to a ring gear of the third planetary gear set.

A planetary gear set is understood to mean, in particular, a gear set which comprises at least one sun gear with which one or more planetary gears mesh, a carrier which determines the axes of the planetary gears, and a ring gear with which the planetary gears mesh. Preferably the ring gear has an inner gearing and the sun gear has an outer gearing.

One advantage of the invention may be that the shift elements of the multi-stage transmission, that is to say the brakes and the clutches of the transmission, can easily be reached from outside. The actuators, such as for example electric motors, hydraulic valves, hydraulic pumps and the like, can thus be arranged in the vicinity of the shift elements, as a result of which mechanical and/or hydraulic losses are reduced and less energy may be required for actuating the shift elements. Less energy may also be required in order to keep the shift element in its respective current operating state, that is to say engaged or disengaged, for example, since the pressure losses are also lower due to short lines. It is thus also possible to arrange shift elements on the housing and thus at least partially in a rotationally fixed manner, as a result of which seals which connect a stationary line to a rotating line can be entirely or partially avoided.

The spatial arrangement of the easily reachable shift elements also makes it easier to replace the lamellar clutches or brakes, which are usually actuated hydraulically, with for example brakes and clutches which are actuated electromechanically or electrohydraulically and which can be actuated comparatively easily according to demand. Easily reachable shift elements are, on the one hand, brakes, which couple a shaft to the housing in a rotationally fixed manner, but also shift elements on outer shafts of the multi-stage transmission, preferably on the drive shaft or output shaft, which can be supplied in a comparatively easy manner with the hydraulic fluid that is necessary for actuation.

Besides this property, the multi-stage transmission also has a good gearing efficiency, only small loads on the components, in particular low planetary set and shift element torques, low absolute and relative speeds of rotation and/or low construction complexity. The latter makes it possible to implement the multi-stage transmission with only low weight and low costs. Finally, the multi-stage transmission also permits a good transmission ratio range, that is to say a highly practical stepping of the gears.

In general, one preferred embodiment of the multi-stage transmission comprises four planetary gear sets, three clutches, three brakes and no fixed housing coupling. An alternative embodiment of the multi-stage transmission comprises in general four clutches, two brakes and one fixed housing coupling.

By actuating, in each case, two shift elements (brakes and/or clutches), nine forward gears and one reverse gear can be shifted, three further alternative shift positions being available for the fourth gear.

As start-up elements, use may be made of a hydrodynamic torque converter, a hydrodynamic clutch, an additional start-up clutch, an integrated start-up clutch or brake and/or an additional electric machine.

In principle, an electric machine or another power source can be arranged on each shaft. In principle, a freewheel to the housing or to another shaft can also be arranged on each shaft.

The multi-stage transmission is preferably implemented as a standard drive, but a front-transverse design is also conceivable.

All the shift elements can act in a friction-locking or form-locking manner. Preferably, however, the third brake and/or the fourth clutch are configured as a form-locking brake or clutch, in particular as claw clutches, which leads to a considerably improved efficiency and thus to considerable advantages in terms of fuel consumption.

It has been found that the third brake and/or the fourth clutch has to be actuated just once when shifting from the first to the ninth gear. These shift elements are therefore particularly suitable for being configured as a claw clutch. It has also been found that for these shift elements, due to their comparatively seldom actuation, the advantage of better efficiency outweighs the disadvantage of more difficult handling. In particular, it has been found that the actuation of these shift elements can take place at a relatively high gear, as a result of which the difference in the speed of rotation of the shafts may be low and thus is favorable for the actuation of a claw clutch.

The geometric position (order) of the individual gear sets and shift elements can be selected freely, as long as it permits the connection of the elements. The position of individual elements can thus be moved at will.

Further advantageous variants of the multi-stage transmission emerge from the dependent claims and also from the description in conjunction with the figures. In terms of function, these all have the same properties as the main system, in particular similar efficiency, similar stepping, etc.

BRIEF DESCRIPTION OF THE DRAWINGS

For the sake of better understanding of the invention, they will be explained in more detail with reference to the following figures.

In the figures, which each show a highly schematic, simplified representation.

DETAILED DESCRIPTION OF THE PREFERRED EMBODIMENTS

By way of introduction, it should be noted that in the different described embodiments the same parts are provided with the same reference characters and the same component names, wherein the disclosures contained throughout the entire description can be correspondingly transferred to identical parts bearing the same reference characters and/or the same component names. In addition, the position details selected in the description, such as, for example, top, bottom, side, etc., are based on the figure that is being directly described and shown and, in the event of a change in position, are to be correspondingly transferred to the new position. Furthermore, individual features or combinations of features from the different example embodiments that are shown and described can also represent stand-alone inventive solutions or solutions according to the invention.

Figure 1:
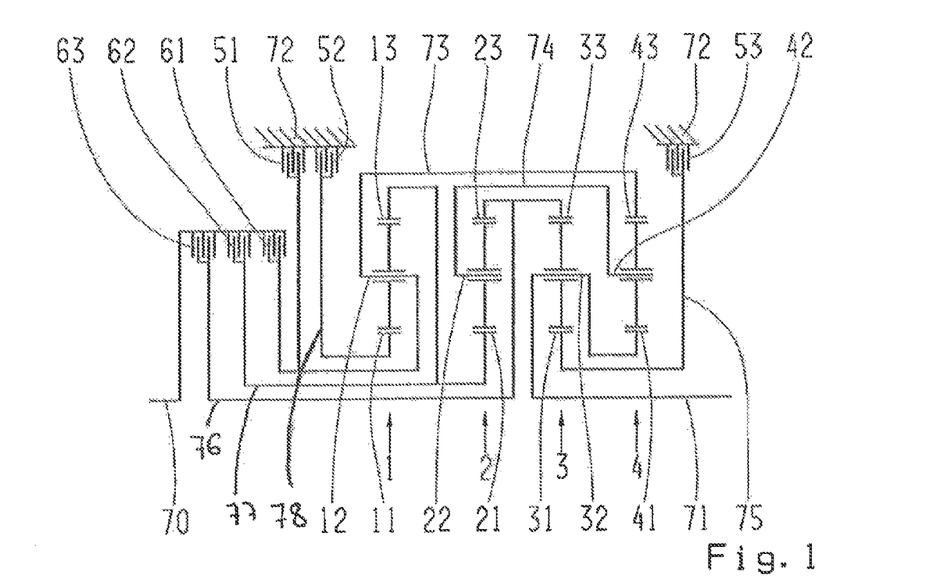
FIG. 1 shows a first example variant, shown schematically, of a multi-stage transmission according to the invention.

FIG. 1 shows a multi-stage transmission comprising four planetary gear sets 1, 2, 3, 4, a drive shaft 70, an output shaft 71, six further rotatable shafts 73, 74, 75, 76, 77, 78, and six shift elements 51, 52, 53, 61, 62, 63, of which three are brakes 51, 52, 53 and three are clutches 61, 62, 63. The four planetary gear sets 1, 2, 3, 4 are arranged one behind the other in the following order: first planetary gear set 1, second planetary gear set 2, third planetary gear set 3, fourth planetary gear set 4. The first planetary gear set 1 the second planetary gear set 2, the third planetary gear set 3 and the fourth planetary gear set 4 are configured as minus planetary gear sets. The planetary gear sets 1, 2, 3, 4 are jointly enclosed by a housing 72. In the variant of the multi-stage transmission of FIG. 1 a carrier 12 of a first planetary gear set 1 and a ring gear 43 of a fourth planetary gear set 4 can be coupled to the housing 72, via a first brake 51, or to the drive shaft 70, via a first clutch 61, a sun gear 11 of the first planetary gear set 1 can be coupled to the housing 72, via a second brake 52, a ring gear 13 of the first planetary gear set 1 and a sun gear 21 of a second planetary gear set 2 can be coupled to the drive shaft 70, via a second clutch 62, the drive shaft 70 can be coupled to a ring gear 23 of the second planetary gear set 2, via a third clutch 63, a carrier 22 of the second planetary gear set 2 is permanently connected to a carrier 42 of the fourth planetary gear set 4, a carrier 32 of a third planetary gear set 3 and a sun gear 41 of the fourth planetary gear set 4 are permanently connected to the drive shaft 70, the sun gear 31 of the third planetary gear set 3 can be coupled to the housing 72, via a third brake 53, and the ring gear 23 of the second planetary gear set 2 is permanently connected to the ring gear 33 of the third planetary gear set 3 and to the shaft 76.

Figure 2:
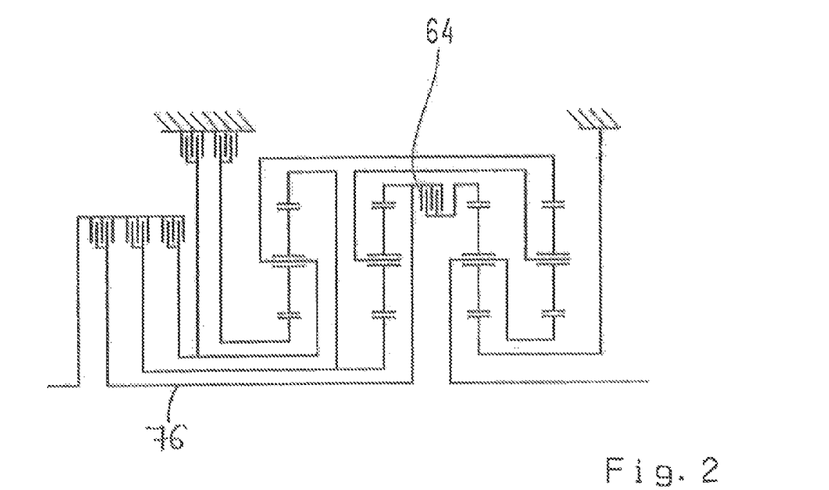
FIG. 2 shows a second example variant, shown schematically, of a multi-stage transmission according to the invention.

FIG. 2 shows a multi-stage transmission which is very similar to the multi-stage transmission of FIG. 1 and differs from the embodiment of FIG. 1 in the following points:

the sun gear 31 of the third planetary gear set 3 is permanently connected to the housing 72, and the ring gear 23 of the second planetary gear set 2 is permanently connected to the shaft 76 and can be coupled to the ring gear 33 of the third planetary gear set 3, via a fourth clutch 64.

In the multi-stage transmission shown in FIG. 1, the following gears can be shifted: A first gear can be achieved by the engaged second brake 52, the engaged third brake 53 and the engaged second clutch 62.

A second gear can be achieved by the engaged second brake 52, the engaged third brake 53 and the engaged first clutch 61.

A third gear can be achieved by the engaged third brake 53, the engaged first clutch 61 and the engaged second clutch 62.

A fourth gear can be achieved by the engaged third brake 53, the engaged second clutch 62 and the engaged third clutch 63, or by the engaged first brake 51, the engaged third brake 53 and the engaged third clutch 63, or by the engaged second brake 52, the engaged third brake 53 and the engaged third clutch 63, or by the engaged third brake 53, the engaged first clutch 61 and the engaged third clutch 63.

A fifth gear can be achieved by the engaged first clutch 61, the engaged second clutch 62 and the engaged third clutch 63.

A sixth gear can be achieved by the engaged second brake 52, the engaged first clutch 61 and the engaged third clutch 63.

A seventh gear can be achieved by the engaged second brake 52, the engaged second clutch 62 and the engaged third clutch 63.

An eighth gear can be achieved by the engaged first brake 51, the engaged second brake 52 and the engaged third clutch 63.

A ninth gear can be achieved by the engaged first brake 51, the engaged second clutch 62 and the engaged third clutch 63.

A reverse gear can be achieved by the engaged first brake 51, the engaged third brake 53 and the engaged second clutch 62.

The shift elements that are not mentioned in each case are disengaged.

Figure 3:
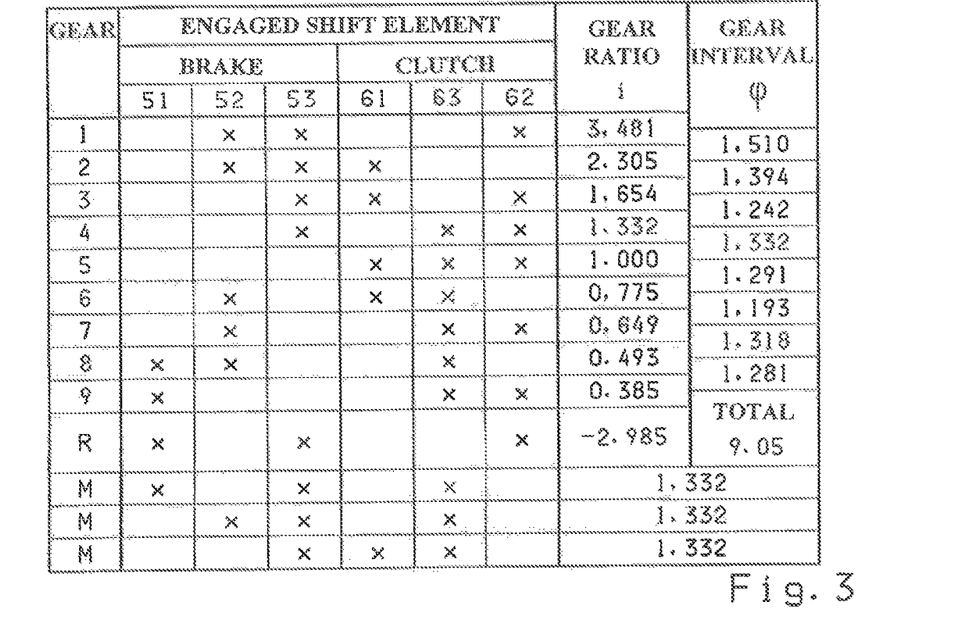
FIG. 3 shows a table indicating the engaged shift elements, in each gear step, for the transmission variant shown in FIG. 1.

This is also shown in the table in FIG. 3, which also shows the transmission ratios of the respective gear steps.

In the multi-stage transmission shown in FIG. 2, the following gears can be shifted:

A first gear can be achieved by the engaged second brake 52, the engaged second clutch 62 and the engaged fourth clutch 64.

A second gear can be achieved by the engaged second brake 52, the engaged first clutch 61 and the engaged fourth clutch 64.

A third gear can be achieved by the engaged first clutch 61, the engaged second clutch 62 and the engaged fourth clutch 64.

A fourth gear can be achieved by the engaged first clutch 61, the engaged third clutch 63 and the engaged fourth clutch 64, or by the engaged first brake 51, the engaged third clutch 63 and the engaged fourth clutch 64, or by the engaged second brake 52, the engaged third clutch 63 and the engaged fourth clutch 64, or by the engaged second clutch 62, the engaged third clutch 63 and the engaged fourth clutch 64.

A fifth gear can be achieved by the engaged first clutch 61, the engaged second clutch 62 and the engaged third clutch 63.

A sixth gear can be achieved by the engaged second brake 52, the engaged first clutch 61 and the engaged third clutch 63.

A seventh gear can be achieved by the engaged second brake 52, the engaged second clutch 62 and the engaged third clutch 63.

An eighth gear can be achieved by the engaged first brake 51, the engaged second brake 52 and the engaged third clutch 63.

A ninth gear can be achieved by the engaged first brake 51, the engaged second clutch 62 and the engaged third clutch 63.

A reverse gear can be achieved by the engaged first brake 51, the engaged second clutch 62 and the engaged fourth clutch 64.

The shift elements that are not mentioned in each case are disengaged.

Figure 4:
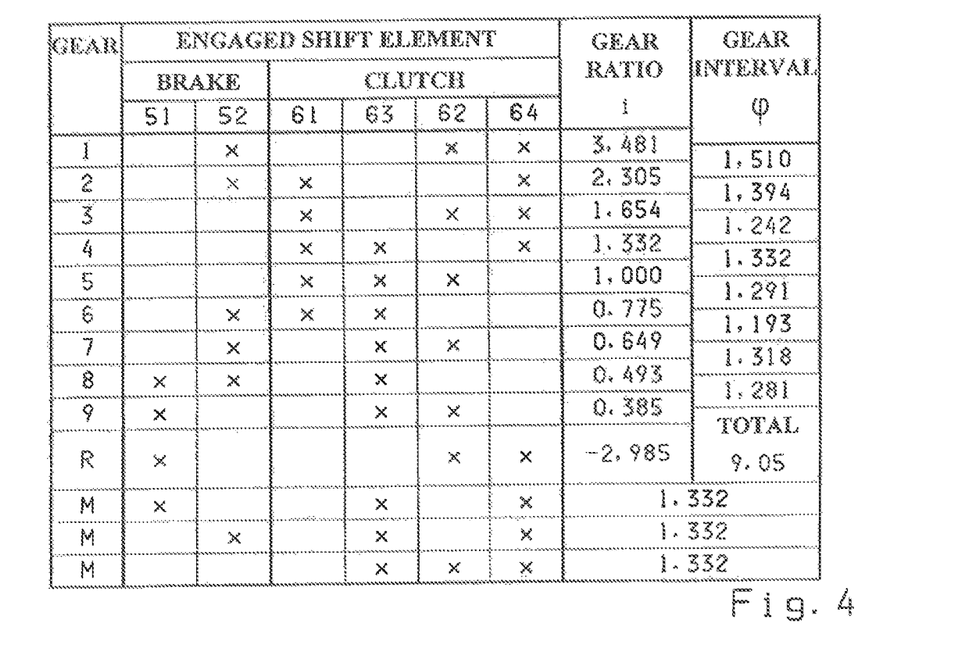
FIG. 4 shows a table indicating the engaged shift elements, in each gear step, for the transmission variant shown in FIG. 2.

This is also shown in the table in FIG. 4, which also shows the transmission ratios of the respective gear steps.

In the illustrated multi-stage transmissions, preferably all the gear sets 1, 2, 3, 4 are configured as minus gear sets.

In one advantageous variant, the transmission ratio:

of the first gear set 1, between the sun gear 11 and the ring gear 13, is −3.900 and/or of the second gear set 2, between the sun gear 21 and the ring gear 23, is −2.146 and/or of the third gear set 3, between the sun gear 31 and the ring gear 33, is −1.634 and/or of the fourth gear set 4, between the sun gear 41 and the ring gear 43, is −3.045.

Figure 1A:
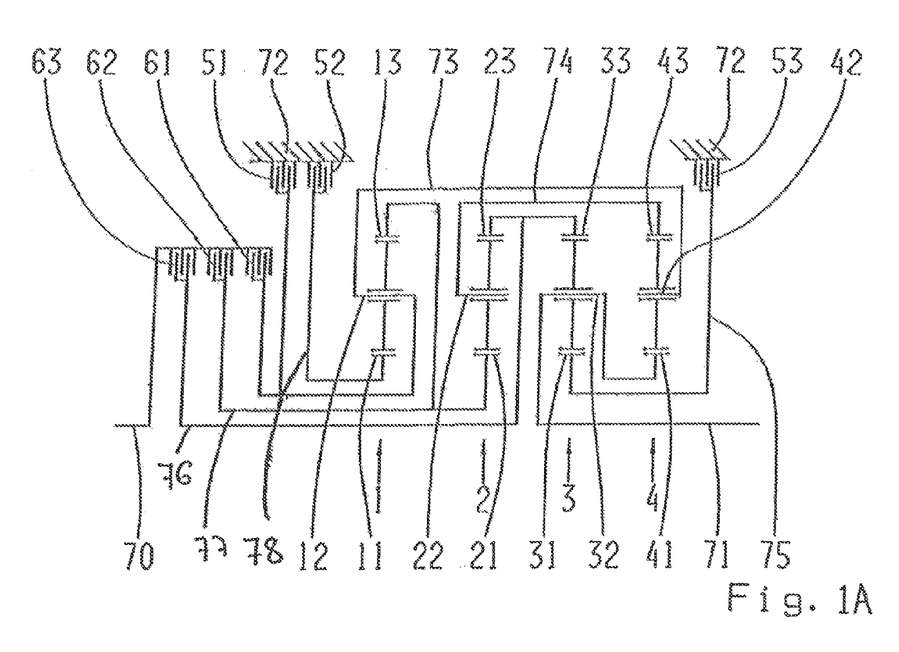
FIG. 1A shows a variant of the first example, shown schematically, of a multi-stage transmission according to the invention.

In general, instead of a first specified connection/coupling to a carrier 12, 22, 32, 42 of a gear set 1, 2, 3, 4 and a second specified connection/coupling to a ring gear 13, 23, 33, 43 of this gear set 1, 2, 3, 4 as shown in FIG. 1, the first specified connection/coupling is formed to said ring gear 13, 23, 33, 43 of this gear set 1, 2, 3, 4 and the second specified connection/coupling is formed to said carrier 12, 22, 32, 42 of this gear set 1, 2, 3, 4 as shown in FIG. 1A, wherein this gear set 1, 2, 3, 4 is configured as a plus gear set as shown in FIG. 1A instead of as a minus gear set as shown in FIG. 1 and as a minus gear set instead of as a plus gear set, respectively. In other words, the connections/couplings to the carrier 12, 22, 32, 42 and to the ring gear 13, 23, 33, 43 of a gear set 1, 2, 3, 4 are swapped and the direction of rotation between the sun gear 11, 21, 31, 41 and the ring gear 13, 23, 33, 43 of this gear set 1, 2, 3, 4 is reversed. When designing the multi-stage transmission, care should additionally be taken to ensure that the value of the stationary transmission ratio of this gear set is increased or decreased by 1 if the shiftable transmission ratios between the input drive 70 and the output drive 71 are otherwise to remain the same. By varying the gear sets 1, 2, 3, 4 in the specified manner, therefore, the connection/coupling between the individual transmission elements can be changed without changing the characteristic of the transmission. A large number of design embodiments are thus available which may simplify the implementation of the transmission in the case in question. The aforementioned swapping of the connection/coupling is not limited to one gear set 1, 2, 3, 4 but rather can also be applied simultaneously to a plurality of gear sets 1, 2, 3, 4.

The example embodiments show possible variant embodiments of a multi-stage transmission according to the invention, wherein it should be noted at this point that the invention is not limited to the specifically shown variant embodiments thereof, but rather various combinations of the individual variant embodiments with one another are also possible, and this possibility for variation based on the technical teaching of the present invention lies within the capability of a person skilled in the art operating in this technical field. In particular, the possibilities which are obvious from the combinatorics, but which are not explicitly shown in the figures, are also covered by the scope of protection. In addition, all conceivable variant embodiments which are possible through combinations of individual details of the variant embodiments that have been shown and described are also covered by the scope of protection.

As a matter of form, it should finally be pointed out that, for a better understanding of the structure of the multi-stage transmission, the latter is shown schematically in the figures and therefore in reality may comprise more components than shown, fewer components than shown, or also other components. In general, the specific design lies within the capability of a person skilled in the art.

The problem addressed by the stand-alone inventive solutions can be found in the description.

LIST OF REFERENCE CHARACTERS

1 first transmission gear set
2 second transmission gear set 3 third transmission gear set
4 fourth transmission gear set
11 sun gear of the first transmission gear set
12 carrier of the first transmission gear set
13 ring gear of the first transmission gear set
21 sun gear of the second transmission gear set
22 carrier of the second transmission gear set
23 ring gear of the second transmission gear set
31 sun gear of the third transmission gear set
32 carrier of the third transmission gear set
33 ring gear of the third transmission gear set
41 sun gear of the fourth transmission gear set
42 carrier of the fourth transmission gear set
43 ring gear of the fourth transmission gear set
51 first brake
52 second brake
53 third brake
61 first clutch
62 second clutch
63 third clutch
64 fourth clutch
70 input drive
71 output drive
72 housing
73, 74, 75, 76, 77, 78, shaft

The invention claimed is:

1. A multi-stage transmission comprising:
at least four planetary gear sets (1, 2, 3, 4),
a housing (72),
a drive shaft (70), and
an output shaft (71),
wherein a carrier (12) of a first planetary gear set (1) and a ring gear (43) of a fourth planetary gear set (4) can be coupled to either the housing (72), via a first brake (51), or to the drive shaft (70), via a first clutch (61),
a sun gear (11) of the first planetary gear set (1) can be coupled to the housing (72), via a second brake (52),
a ring gear (13) of the first planetary gear set (1) and a sun gear (21) of a second planetary gear set (2) can be coupled to the drive shaft (70), via a second clutch (62),
the drive shaft (70) can be coupled to a ring gear (23) of the second planetary gear set (2), via a third clutch (63),
a carrier (22) of the second planetary gear set (2) is permanently connected to a carrier (42) of the fourth planetary gear set (4),
a carrier (32) of a third planetary gear set (3) and a sun gear (41) of the fourth planetary gear set (4) are permanently connected to the output shaft (71), and one of the following two connections is configured as a permanent connection while another of the following two connections is configured such as to be able to be released by at least one shift element:
a connection of a sun gear (31) of the third planetary gear set (3) to the housing (72), and
a connection of the ring gear (23) of the second planetary gear set (2) to a ring gear (33) of the third planetary gear set (3).

2. The multi-stage transmission according to claim 1, wherein the sun gear (31) of the third planetary gear set (3) can be coupled to the housing (72), via a third brake (53), and
the ring gear (23) of the second planetary gear set (2) is permanently connected to the ring gear (33) of the third planetary gear set (3) and to a sixth shaft (76).

3. The multi-stage transmission according to claim 1, wherein the sun gear (31) of the third planetary gear set (3) is permanently connected to the housing (72), and the ring gear (23) of the second planetary gear set (2) is permanently connected to a sixth shaft (76) and the sixth shaft (76) can be coupled to the ring gear (33) of the third planetary gear set (3), via a fourth clutch (64).

4. The multi-stage transmission according to claim 2, wherein the following gears can be shifted by engaging specified shift elements:
a first gear by engagement of the second brake (52), the third brake (53) and the second clutch (62),
a second gear by engagement of the second brake (52), the third brake (53) and the first clutch (61),
a third gear by the third brake (53), the first clutch (61) and the second clutch (62),
a fourth gear by engagement of either:
a) the third brake (53), the second clutch (62) and the third clutch (63),
b) the first brake (51), the third brake (53) and the third clutch (63),
c) the second brake (52), the third brake (53) and the third clutch (63), or
d) the third brake (53), the first clutch (61) and the third clutch (63),
a fifth gear by engagement the first clutch (61), the second clutch (62) and the third clutch (63),
a sixth gear by engagement of the second brake (52), the first clutch (61) and the third clutch (63),
a seventh gear by engagement of the second brake (52), the second clutch (62) and the third clutch (63),
an eighth gear by engagement of the first brake (51), the second brake (52) and the third clutch (63),
a ninth gear by engagement of the first brake (51), the second clutch (62) and the third clutch (63),
a reverse gear by engagement of the first brake (51), the third brake (53) and the second clutch (62), and
shift elements not mentioned are not actuated or are disengaged.

5. The multi-stage transmission according to claim 3, wherein the following gears can be shifted by engaging specified elements:
a first gear by engagement of the second brake (52), the second clutch (62) and the fourth clutch (64),
a second gear by engagement of the second brake (52), the first clutch (61) and the fourth clutch (64),
a third gear by engagement of the first clutch (61), the second clutch (62) and the fourth clutch (64),
a fourth gear by engagement of one of:
a) the first clutch (61), the third clutch (63) and the fourth clutch (64),
b) the first brake (51), the third clutch (63) and the fourth clutch (64),
c) the second brake (52), the third clutch (63) and the fourth clutch (64), or
d) the second clutch (62), the third clutch (63) and the fourth clutch (64),
a fifth gear by engagement of the first clutch (61), the second clutch (62) and the third clutch (63),
a sixth gear by engagement of the second brake (52), the first clutch (61) and the third clutch (63),
a seventh gear by engagement of the second brake (52), the second clutch (62) and the third clutch (63),
an eighth gear by engagement of the first brake (51), the second brake (52) and the third clutch (63),
a ninth gear by engagement of the first brake (51), the second clutch (62) and the third clutch (63),
a reverse gear by engagement of the first brake (51), the second clutch (62) and the fourth clutch (64), and shift elements not mentioned are not actuated or are disengaged.

6. The multi-stage transmission according to claim 1, wherein each one of the four planetary gear sets (1, 2, 3, 4) is configured as a minus gear set.

7. The multi-stage transmission according to claim 6, wherein the multi-stage transmission has at least one of the following:
a transmission ratio of −3.900 for the first gear set (1) between the sun gear (11) and the ring gear (13),
a transmission ratio of −2.146 for the second gear set (2) between the sun gear (21) and the ring gear (23),
a transmission ratio of −1.634 for the third gear set (3) between the sun gear (31) and the ring gear (33), and
a transmission ratio of −3.045 for the fourth gear set (4) between the sun gear (41) and the ring gear (43).

8. The multi-stage transmission according to claim 1, wherein at least one of the third brake (53) and the fourth clutch (64) is configured as a claw clutch.

9. A multi-stage transmission comprising:
at least four planetary gear sets,
a housing,
a drive shaft, and
an output shaft,
wherein a carrier of a first planetary gear set and a ring gear of a fourth planetary gear set can be coupled to either the housing, via engagement of a first brake, or to the drive shaft, via engagement of a first clutch,
a sun gear of the first planetary gear set can be coupled to the housing, via engagement of a second brake,
a ring gear of the first planetary gear set and a sun gear of a second planetary gear set can be coupled to the drive shaft, via engagement of a second clutch,
the drive shaft can be coupled to a ring gear of the second planetary gear set, via engagement of a third clutch,
a carrier of the second planetary gear set is permanently connected to a carrier of the fourth planetary gear set,
a carrier of a third planetary gear set and a sun gear of the fourth planetary gear set are permanently connected to the output shaft, and one of the following two connections is configured as a permanent connection while another of the following two connections is configured as a releaseable connection by one shift element:
a connection of a sun gear of the third planetary gear set to the housing, and
a connection of the ring gear of the second planetary gear set to a ring gear of the third planetary gear set.

10. The multi-stage transmission according to claim 9, wherein the sun gear of the third planetary gear set can be coupled to the housing, via a third brake, and
the ring gear of the second planetary gear set is permanently connected to the ring gear of the third planetary gear set and to a sixth shaft.

11. The multi-stage transmission according to claim 9, wherein the sun gear of the third planetary gear set is permanently connected to the housing, and
the ring gear of the second planetary gear set is permanently connected to a sixth shaft and the sixth shaft can be coupled to the ring gear of the third planetary gear set, via a fourth clutch.

12. The multi-stage transmission according to claim 10, wherein the following gears can be shifted by engaging specified shift elements:
a first gear by engagement of the second brake, the third brake and the second clutch,
a second gear by engagement of the second brake, the third brake and the first clutch,
a third gear by the third brake, the first clutch and the second clutch,
a fourth gear by engagement of either:
  a) the third brake, the second clutch and the third clutch,
  b) the first brake, the third brake and the third clutch,
  c) the second brake, the third brake and the third clutch, or
  d) the third brake, the first clutch and the third clutch,
a fifth gear by engagement the first clutch, the second clutch and the third clutch,
a sixth gear by engagement of the second brake, the first clutch and the third clutch,
a seventh gear by engagement of the second brake, the second clutch and the third clutch,
an eighth gear by engagement of the first brake, the second brake and the third clutch,
a ninth gear by engagement of the first brake, the second clutch and the third clutch,
a reverse gear by engagement of the first brake, the third brake and the second clutch, and
shift elements not mentioned are not actuated or are disengaged.

13. The mufti-stage transmission according to claim 11, wherein the following gears can be shifted by engaging specified elements:
a first gear by engagement of the second brake, the second clutch and the fourth clutch,
a second gear by engagement of the second brake, the first clutch and the fourth clutch,
a third gear by engagement of the first clutch, the second clutch and the fourth clutch
a fourth gear by engagement of one of:
  a) the first clutch, the third clutch and the fourth clutch,
  b) the first brake, the third clutch and the fourth clutch,
  c) the second brake, the third clutch and the fourth clutch, or
  d) the second clutch, the third clutch and the fourth clutch,
a fifth gear by engagement of the first clutch, the second clutch and the third clutch,
a sixth gear by engagement of the second brake, the first clutch and the third clutch,
a seventh gear by engagement of the second brake, the second clutch and the third clutch,
an eighth gear by engagement of the first brake, the second brake and the third clutch,
a ninth gear by engagement of the first brake, the second clutch and the third clutch,
a reverse gear by engagement of the first brake, the second clutch and the fourth clutch, and
shift elements not mentioned are not actuated or are disengaged.

14. A multi-stage transmission comprising:
at least first, second, third and fourth planetary gear sets (1, 2, 3, 4), each of the first, the second, the third and the fourth planetary gear sets comprising a first element, a second element and a third element,
a housing (72),
a drive shaft (70), and
an output shaft (71),
the second element (12) of the first planetary gear set (1) and the third element (43) of the fourth planetary gear set (4) can be coupled to either the housing (72), via a first brake (51), or to the drive shaft (70), via a first clutch (61), the first element (11) of the first planetary gear set (1) can be coupled to the housing (72), via a second brake (52), the third element (13) of the first planetary gear set (1) and the first element (21) of the second planetary gear set (2) can be coupled to the drive shaft (70), via a second clutch (62), the drive shaft (70) can be coupled to the third element (23) of the second planetary gear set (2), via a third clutch (63), the second element (22) of the second planetary gear set (2) is permanently connected to the second element (42) of the fourth planetary gear set (4), the second element (32) of the third planetary gear set (3) and the first element (41) of the fourth planetary gear set (4) are permanently connected to the output shaft (71), and one of the following two connections is configured as a permanent connection while another of the following two connections is configured such as to be able to be released by at least one shift element:

a connection of the first element (31) of the third planetary gear set (3) to the housing (72), a connection of the third element (23) of the second planetary gear set (2) to the third element (33) of the third planetary gear set (3), the first element of the first, the second, the third and the fourth planetary gear sets is a sun gear, and for each of the first, the second, the third and the fourth planetary gear sets which are configured as a minus planetary gear set, the second element thereof is a carrier and the third element thereof is a ring gear, and for each of the first, the second, the third and the fourth planetary gear sets which are configured as a plus planetary gear set, the second element thereof is the ring gear and the third element thereof is the carrier.

* * * * *